Aug. 29, 1967     J. P. ROSCOE     3,338,056
FINGERLING SAVING SYSTEM
Filed Oct. 22, 1965     5 Sheets-Sheet 1
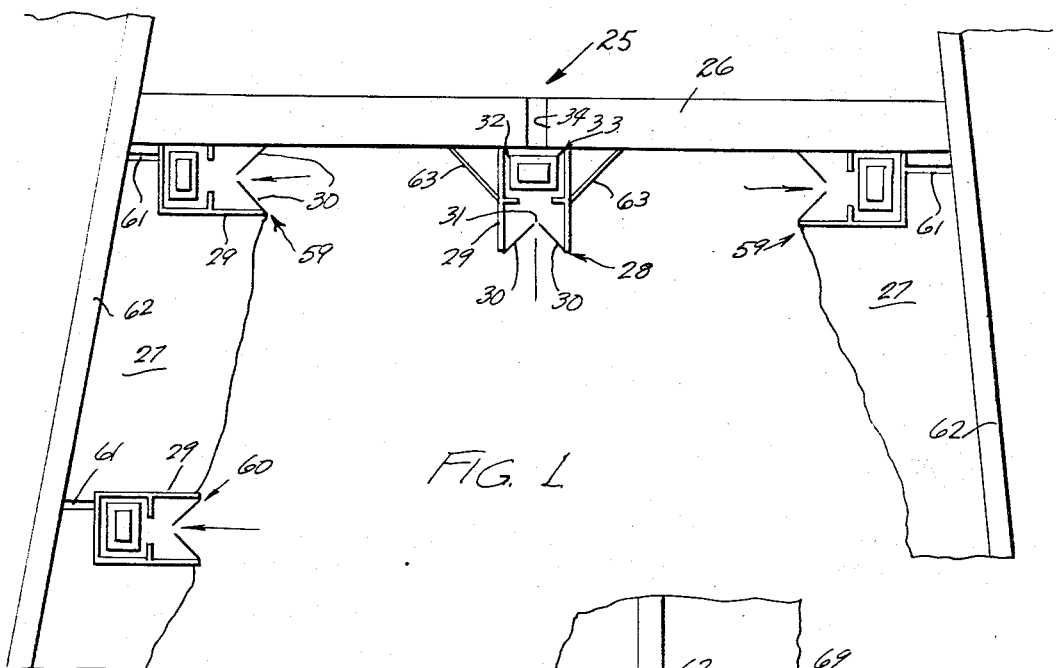
FIG. 1
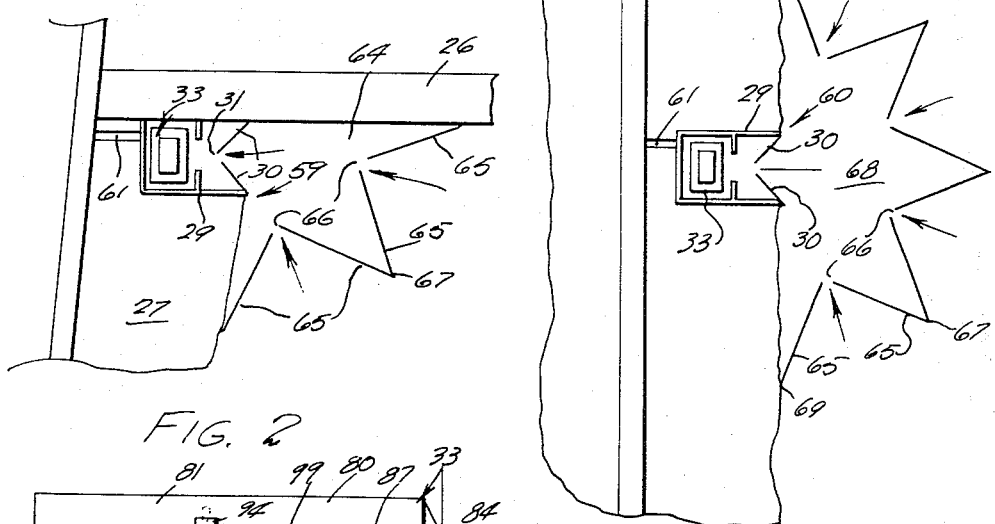
FIG. 2
FIG. 3
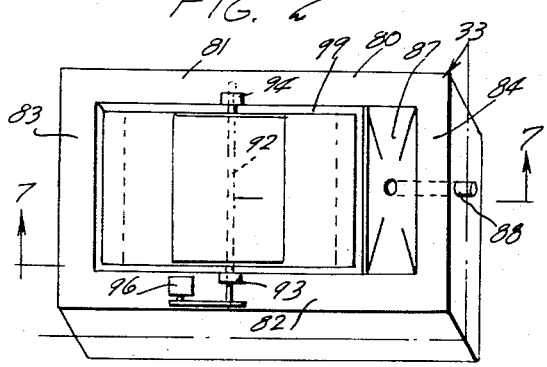
FIG. 6
INVENTOR.
JOHN P. ROSCOE
BY
Berman, Davidson & Berman
ATTORNEYS

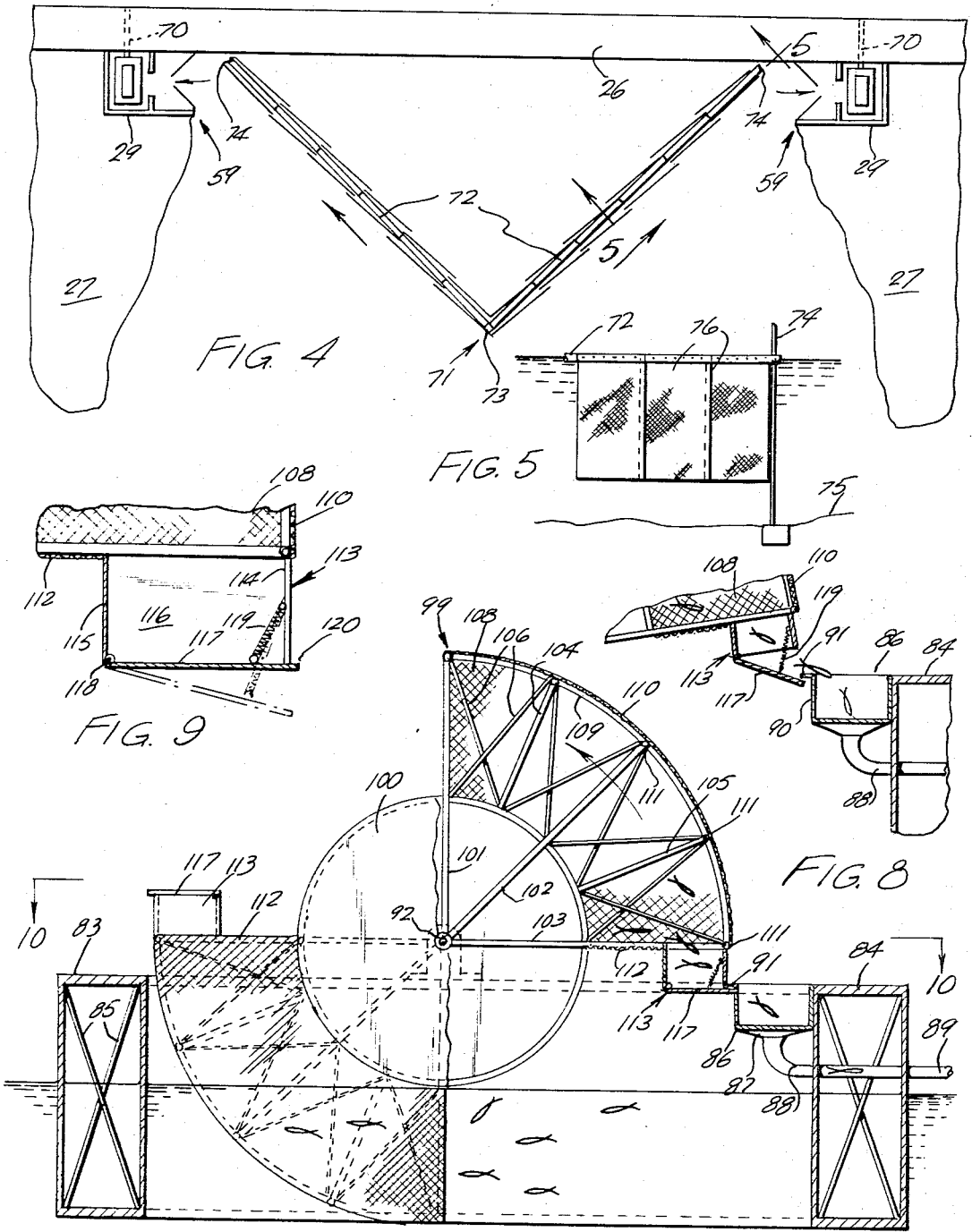

Aug. 29, 1967  J. P. ROSCOE  3,338,056
FINGERLING SAVING SYSTEM
Filed Oct. 22, 1965  5 Sheets-Sheet 3
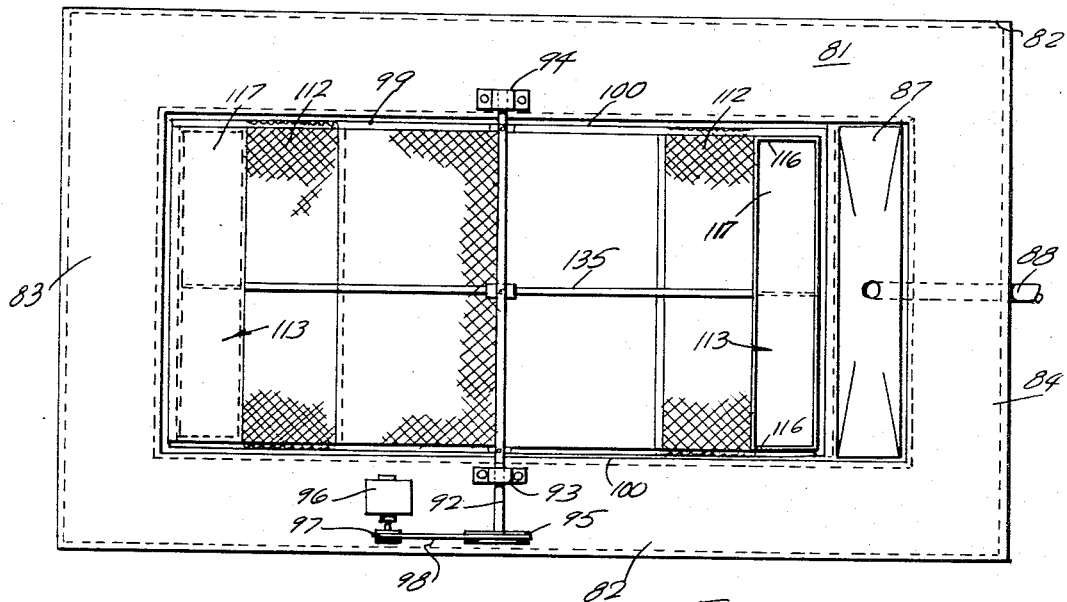
FIG. 10
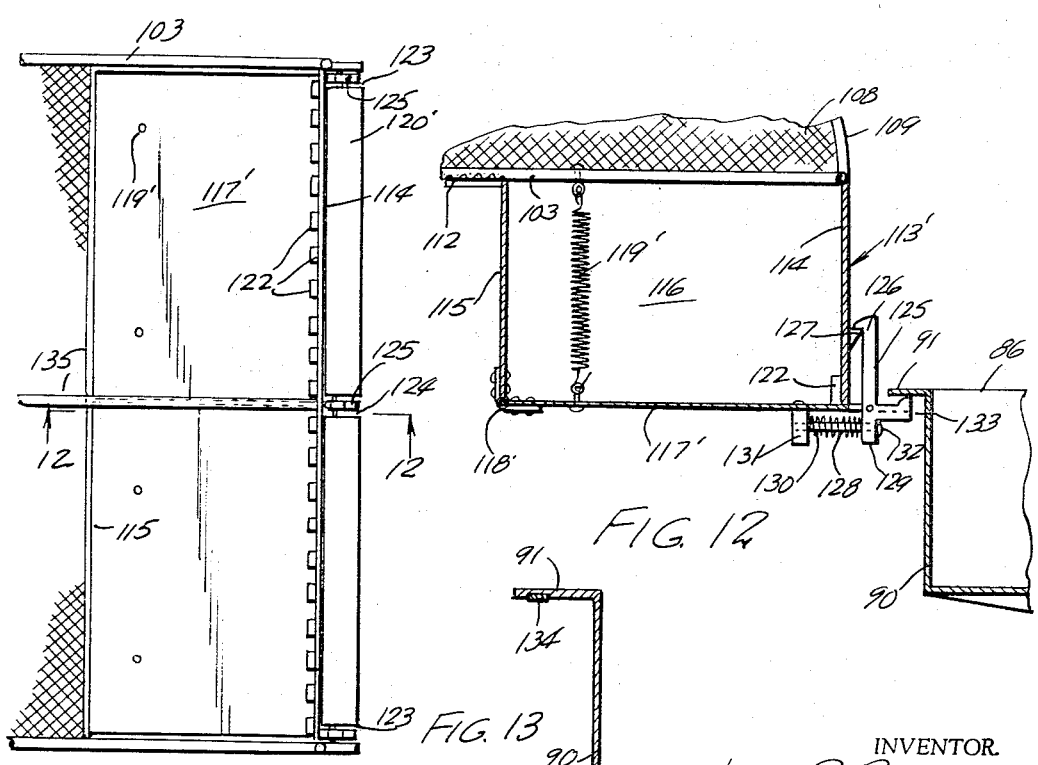
FIG. 11
FIG. 12
FIG. 13
INVENTOR.
JOHN P. ROSCOE
BY
Berman, Davidson & Berman
ATTORNEYS

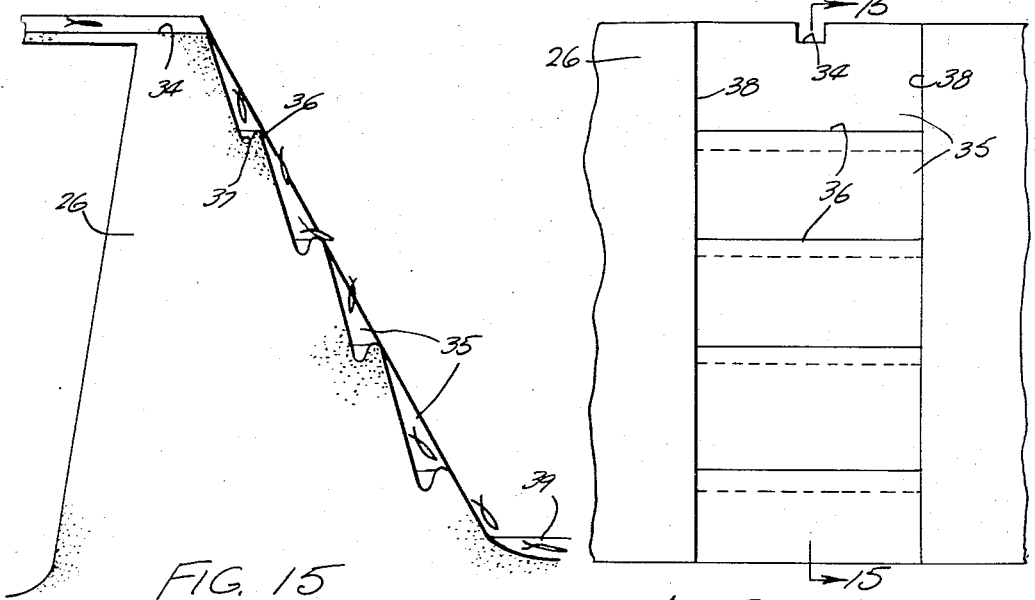
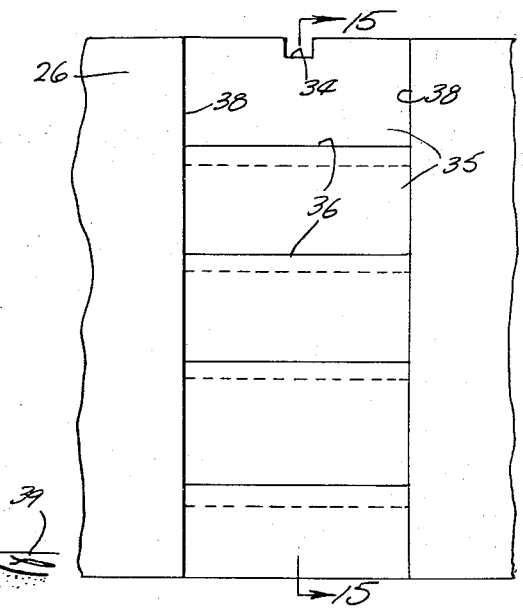
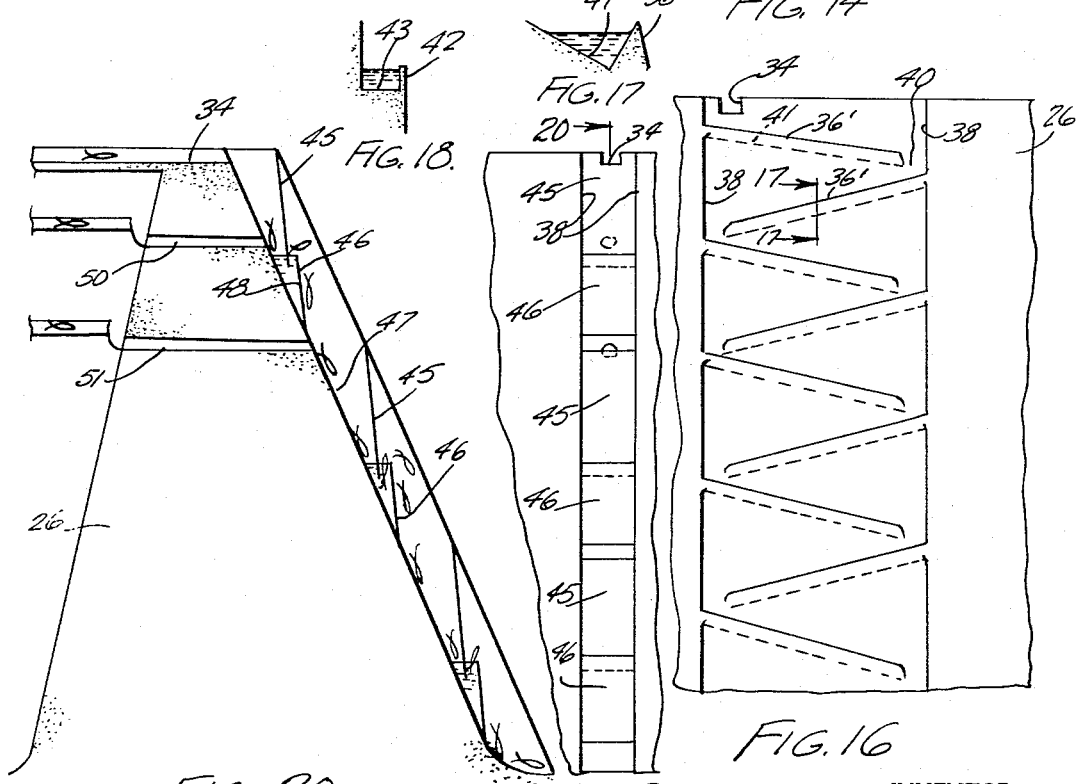
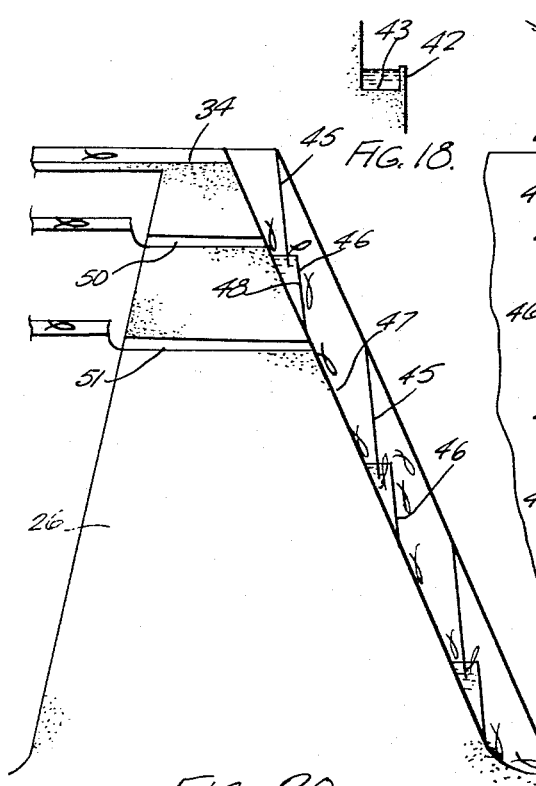

Aug. 29, 1967 J. P. ROSCOE 3,338,056
FINGERLING SAVING SYSTEM
Filed Oct. 22, 1965 5 Sheets-Sheet 5
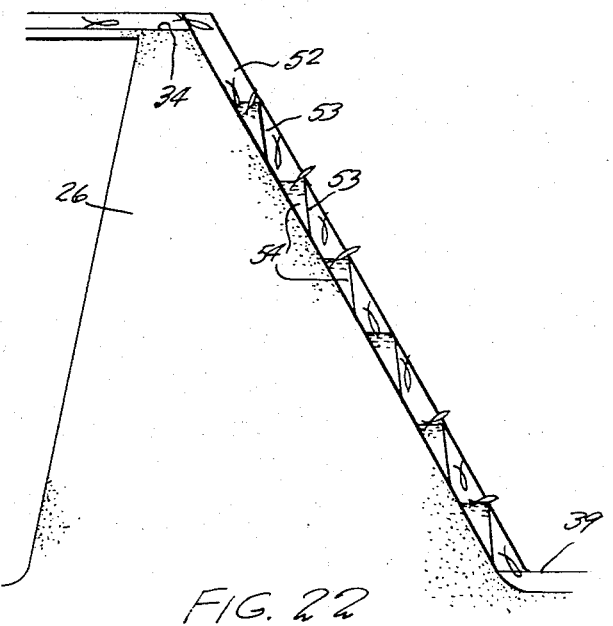
FIG. 22
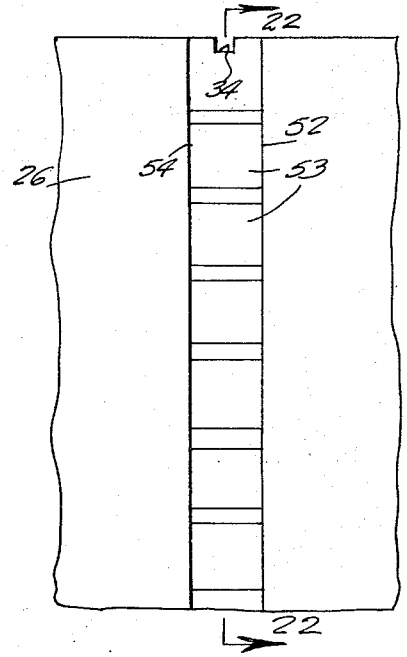
FIG. 21.
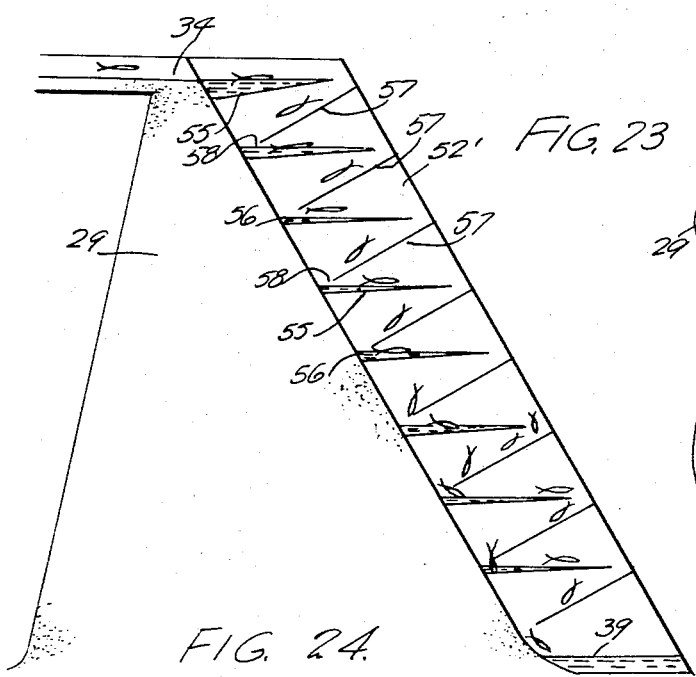
FIG. 23
FIG. 24.
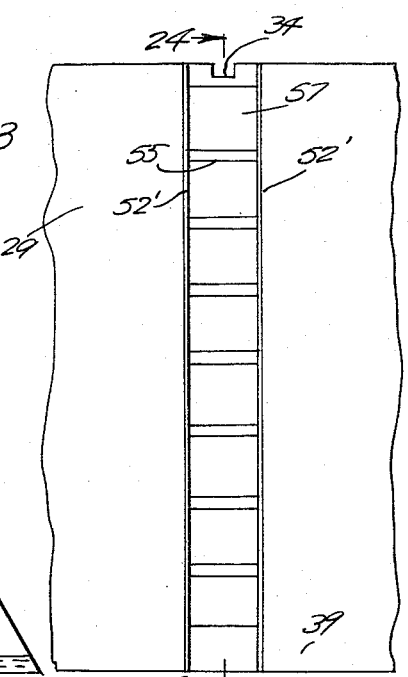
INVENTOR.
JOHN P. ROSCOE
BY
Berman, Davidson + Berman
ATTORNEYS

3,338,056
FINGERLING SAVING SYSTEM
John P. Roscoe, Box 123, Cutten, Calif. 95014
Filed Oct. 22, 1965, Ser. No. 502,199
20 Claims. (Cl. 61—21)

This invention relates to fish conservation systems, and more particularly to a system for transporting fingerlings downstream past a dam or similar obstruction.

The fishing industry of the Columbia River area and other waterways of the Pacific Northwest has been affected adversely by the construction of dams across important waterways because such dams constitute serious obstructions to the return of young fish toward the sea from spawning regions located upstream relative to said dams. This problem applies to salmon and other fish important to the fishing industry. While salmon and other fish can be transported upstream by fish ladders without difficulty, the problem of transporting the young fingerlings downstream from the spawning grounds has heretofore never been adequately solved. This problem is particularly difficult especially where dams of considerable height are encountered, constructed in connection with water-power projects. The difficulty arises due to the tendency of the fingerlings to follow flowing currents of water, and ordinarily such flowing currents go through the turbines of the associated power station. The fingerlings suffer high mortality in passing through the turbine, thereby causing a great loss in the number of fish eventually reaching the sea.

A main object of the present invention is to provide a novel and improved system for safely transporting fingerlings downstream past a dam or similar obstruction.

A further object of the invention is to provide improved apparatus for transporting fingerlings downstream past a dam, the apparatus utilizing the tendency of fingerlings to follow a current of water and including means to properly direct the fingerlings and to physically transport the fingerlings into a receiving conduit or waterway leading downstream which substantially bypasses the dam and which allows the fingerlings to travel over or around the dam in a safe manner wherein the fingerlings can travel gradually down to the lower downstream level with minimum risk of injury.

A further object of the invention is to provide an improved system and apparatus for transporting fingerlings from the upstream side of a dam to the downstream side thereof with minimum risk of injury to the fingerlings, the apparatus being relatively simple in construction, being efficient in operation, and being economical to install and use.

A still further object of the invention is to provide an improved apparatus for transporting fingerlings from the upstream to the downstream side of a dam in a safe and efficient manner, utilizing the tendency of fingerlings to follow a flowing current of water, the apparatus being easy to fabricate and to install, being substantially unaffected by variations in the level of the water at the upstream side of the associated dam, the apparatus being substantially automatic in operation and providing adequate capacity for the transfer of fingerlings while requiring only a relatively small amount of power to operate the same.

Further objects and advantages of the invention will become apparent from the following description and claims, and from the accompanying drawings, wherein:

FIGURE 1 is a fragmentary top plan view of the portion of a waterway adjacent to a dam and illustrating a typical installation, according to the present invention to transport fingerlings from the upstream side of the dam to the downstream side thereof safely and efficiently.

FIGURE 2 is a top plan view diagrammatically illustrating a modified form of fingerling-trap arrangement which may be employed between an end portion of the dam and the shore of the waterway.

FIGURE 3 is a top plan view illustrating a modified form of fingerling-trap arrangement which may be employed at the shore of the waterway at a location spaced from the dam at the upstream side thereof.

FIGURE 4 is a fragmentary top plan view, similar to FIGURE 1, taken at the upstream side of a dam and showing a modified form of fingerling-transporting apparatus according to the present invention.

FIGURE 5 is a fragmentary vertical cross-sectional view, taken substantially on the line 5—5 of FIGURE 4, and illustrating the manner in which the depending screen elements of the central diverting screen assembly of the apparatus are supported in a manner to allow them to automatically adjust themselves responsive to changes in level of the water at the upstream side of the dam.

FIGURE 6 is a top perspective view of one of the fish-transporting rotary assemblies employed in a fingerling-transporting apparatus constructed in accordance with the present invention.

FIGURE 7 is an enlarged longitudinal vertical cross-sectional view taken substantially on the line 7—7 of FIGURE 6.

FIGURE 8 is a fragmentary vertical cross-sectional view illustrating the manner in which fingerlings are automatically released from the transporting receptacles of the fish-wheel assembly of FIGURES 6 and 7, responsive to the rotation of the main rotor element of the fish-wheel assembly.

FIGURE 9 is an enlarged transverse vertical cross-sectional view taken through one of the fish-carrying receptacles of the wheel assembly, shown in its normal closed condition.

FIGURE 10 is a horizontal cross-sectional view taken substantially on the line 10—10 of FIGURE 7.

FIGURE 11 is an enlarged plan view of a modified form of fish-carrying receptacle for use in a fish-wheel assembly, constructed in accordance with the present invention.

FIGURE 12 is an enlarged transverse vertical cross-sectional view taken substantially on the line 12—12 of FIGURE 11.

FIGURE 13 is an enlarged fragmentary vertical cross-sectional detail view taken transversely through the upper portion of the front wall and the horizonal abutment flange of the stationary fish-receiving trough employed in a fish-transporting assembly similar to that shown in FIGURE 6, but somewhat modified.

FIGURE 14 is a fragmentary elevational view of the downstream wall surface of a dam, provided with a fingerling-descent ladder arrangement according to the present invention.

FIGURE 15 is a transverse vertical cross-sectional view taken substantially on the line 15—15 of FIGURE 14.

FIGURE 16 is an elevational view similar to FIGURE 14, but showing a modified form of fingerling-descent ladder arrangement according to this invention.

FIGURE 17 is a fragmentary enlarged transverse vertical cross-sectional detail view taken substantially on line 17—17 of FIGURE 16.

FIGURE 18 is an enlarged fragmentary vertical cross-sectional view, similar to FIGURE 17, but showing a modification in the cross-sectional shape of the fingerling-transport channels.

FIGURE 19 is another fragmentary elevational view, similar to FIGURES 14 and 16, but showing still further modification of a fingerling-descent ladder arrangement according to the present invention.

FIGURE 20 is a transverse vertical cross-sectional view taken substantially on the line 20—20 of FIGURE 19.

FIGURE 21 is another fragmentary elevational view, similar to FIGURES 14, 16, 19 and 21, but showing a still another modification of a fingerling-descent ladder arrangement which may be employed on the downstream side of a dam, in accordance with the present invention.

FIGURE 22 is a transverse vertical cross-sectional view taken substantially on the line 22—22 of FIGURE 21.

FIGURE 23 is another fragmentary elevational view, similar to FIGURES 14, 16, 19 and 21, but showing still further modification of a fingerling-descent ladder arrangement according to the present invention.

FIGURE 24 is a transverse vertical cross-sectional view, taken substantially on the line 24—24 of FIGURE 23.

Referring to the drawings, and more particularly to FIGURE 1, 25 generally designates a waterway leading to a dam 26 which is placed across the waterway to impound the water for the purpose of creating a substantial head of water at the upstream side of the dam for various purposes, such as for driving hydroelectric equipment to generate electric power, for storing water for the purposes of irrigation, or the like, or for any other reason. Thus, in a typical installation as shown in FIGURE 1, the dam 26 extends between the two opposite shores 27, 27 of the waterway. While not specifically shown in the drawings, it will be understood that suitable flumes or conduits are provided to direct the water to the turbines or other utilization means associated with the installation. In order to prevent the young fish migrating downstream from entering the flumes or conduits leading to the turbines or other utilization means, a number of fingerling-trapping stations are provided at strategic points approaching and adjacent to the dam 26 to intercept the fingerlings and transport them safely to suitable conduits or other means provided to convey them safely to the downstream side of the dam 26.

In a typical installation diagrammatically illustrated in FIGURE 1, a fingerling-trapping unit 28 is provided substantially centrally of the dam 26 at the upstream side thereof, the unit 28 comprising an upstream-facing enclosure 29 of suitable screening, or the like, having inwardly-convergent screening panels 30, 30 at its front end, defining a narrow vertical entrance passage 31 leading to the interior of the enclosure. The panels 30, 30 are at the substantial angle to each other, for example, are at an angle of approximately 90° to each other.

The rear portion of the enclosure 29 comprises a substantially rectangular space 32 in which is disposed a floating combined fish-wheel-and-pump unit 33, presently to be described, for conveying fingerlings to a channel 34 provided in the dam 26 and leading to the downstream side thereof. The channel 34 may lead to suitable fish-ladder means provided on the downstream side of the dam, for example, to fish-ladder means such as are illustrated in FIGURES 14 and 15, and FIGURES 16 to 18, and in FIGURES 19 and 20, in FIGURES 21 and 22, and in FIGURES 23 and 24. Thus, as illustrated in FIGURES 14 and 15, the fish-ladder arrangement may comprise successive vertically-adjacent recesses 35, each provided with a forward transverse bottom rib or lip 36 defining a bottom groove or channel 37 therebehind, the ribs 36 being smoothly curved to facilitate the easy travel of fingerlings thereover from one recess 35 downwardly to the next lower and adjacent recess 35 with the flow of water downwardly over the ribs 36 and through the flume defined between the sidewalls 38, 38 of the successive vertically-adjacent recesses 35. Thus, the fingerlings can travel easily with the downward flow of water through the successive recesses 35 and finally reach the lower water level 39, as shown in FIGURE 15, at the downstream side of the dam 26.

As an alternative to the fish-ladder arrangement of FIGURES 14 and 15, the downwardly-successive ribs may be alternately-inclined and may be staggered in the manner illustrated in FIGURE 16, the ribs being shown at 36' and being inclined downwardly from the opposite sidewalls 38, 38 each rib 36' terminating short of the opposite sidewall 38 to define a passageway 40 for water-carrying fingerlings to the upper end of the next lower step. The ribs 36' may be generally triangular in shape, as shown in FIGURE 17, whereby to define inwardly-adjacent generally-triangular channels 41. The stream of water containing the fingerlings thus passes from the top channel 34 into the uppermost channel 41 and thence downwardly from one step to the next through the end passages 40, alternating in direction until the lower water level at the downstream side of the dam is reached.

As shown in FIGURE 18, the ribs may merely comprise vertical wall elements 42 instead of the triangular-shaped wall elements 36', so that the channels 43 defined inwardly-adjacent the vertical wall elements 42, are generally rectangular in shape instead of triangular. The configuration of the elements 42 is the same as that of the ribs 36', and as illustrated in FIGURE 16.

Another alternative arrangement is illustrated in FIGURES 19 and 20. In this arrangement, successive pairs of plate elements 45, 46 are secured between the sidewalls 38, 38, the lowermost plate element 46 extending upwardly from the surface 47 of the downstream side of the channel defined between the sidewalls 38, 38 and the upper plate element 45 being secured between sidewalls 38, 38 in a position substantially parallel to the lower plate element 46, but spaced inwardly therefrom and with its lower edge depending into the chamber 48 defined by the lower plate element 46. The lower marginal portion of the upper plate element 45 is spaced inwardly a sufficient distance from the top marginal portion of the lower plate element 46 to provide ample clearance for fingerlings to pass therebetween and to move over the top edge of the lower plate element 46 with the flow of water thereover so as to convey the fingerlings downwardly to the next step defined by the subjacent pair of plate elements 45, 46. Thus, the pockets 48 serve as means to retard the movement of the fingerlings downwardly through the channel or spillway defined between sidewalls 38, 38 and bottom wall 47, so as to enable the fingerlings to descend safely from one pocket 48 to the next subjacent pocket 48, in a continuous and gradual manner with the flow of water so that the fingerlings are enabled to safely reach the lower water level at the downstream side of the dam.

As shown, additional downwardly-spaced conduits 50 and 51 may be provided in the dam 26, the conduits 50 and 51 being located at spaced distances below the top channel 34, and communicating with the spillway defined between the sidewalls 38, 38. The conduits 50 and 51 are used when the level of water at the upstream side of the dam diminishes because of dry weather, or other reasons, which may cause the upstream water level to drop.

FIGURES 21 and 22 illustrates another alternative arrangement for conveying fingerlings downwardly along the downstream side of the dam. A flume or spillway is defined between a pair of parallel plate members 52, 52 secured to the downstream side of the dam 26, said plate members being of steel, or other suitable durable material. Mounted between and preferably rigidly-secured to the plate members 52, 52 are the spaced, substantially parallel successive transverse retaining plate members 53 which are regularly-spaced downwardly in the manner illustrated in FIGURES 21 and 22 to define a regularly-spaced series of pockets 54 adapted to receive and temporarily retain fingerlings traveling downwardly through the spillway with the flow of water therethrough. The successive pockets 54 are spaced downwardly a short distance from each other, as shown, so that the fingerlings can travel downwardly from one pocket to the next successive pocket adjacent thereto and located therebelow, whereby the fingerlings can travel safely, step-by-step, downwardly through the spillway until they finally reach the water level 39 at the downstream side of the dam.

As shown in FIGURE 22, each pocket 54 is generally triangular in cross-sectional shape, the pocket being defined between the plate 53 and the wall surface of the dam 26 between the plates 52, 52. The bottom edge of each plate 53 is, therefore, in substantially sealing contact with the surface of the dam 26. The plate members 53 may thus be slidably-engaged in grooves provided therefor in the inwardly-opposing surfaces of the parallel plate members 52, 52.

In the further alternative arrangement shown in FIGURES 23 and 24, a flume or spillway is defined between a pair of parallel plate members 52', 52' secured to the surface of the dam 26 on its downstream side, the top end of the flume being in communication with the transverse groove or channel 34.

Uniformly-spaced, substantially-parallel, slightly-inclined plate members 55 are secured between the plate members 52', 52', the plate members 55 extending from the downstream wall surface of the dam 29 at a small angle upwardly and outwardly therefrom so as to define shallow pockets 56 spaced uniformly from the top of the spillway defined between the plate members 52', 52' to the bottom thereof. Also secured between the plate members 52', 52' are downwardly and rearwardly-inclined plate members 57 whose innermost edges terminate short distances from the inner corners of the shallow pockets 56, defining narrow passages 58 through which fingerlings may travel as they move downwardly along the plate members 57 into the pockets 56, as shown in FIGURE 24. The outer edges of the plate members 55 terminate short distances inwardly from the top edges of the plate members 57 so that the fingerlings may travel over said outer edges onto the upper marginal portions of the plate members 57 and thence downwardly along the plate members 57 toward the passages 58. Thus, the fingerlings may travel downwardly through the flume defined between the plate members 52', 52' in a retarded and gradual manner so that they may pass downwardly through the flume safely and continuously with the flow of water therethrough. Finally, the fingerlings will reach the downstream water level 39.

As shown in FIGURE 1, additional fingerlings-trapping units, shown at 59, 59, may be provided in the corners between the respective ends of dam 26 and the shores 27, 27 of the waterway at the upstream side of the dam. Further fingerling-trapping units 60 may be provided at short locations spaced upstream from the corner trapping units 59, 59. The fingerling-trapping units 59 and 60 are similar in construction to the centrally-located fingerling-trapping unit 28, but discharge into ducts 61 leading to dam-bypassing side ducts or channels 62 terminating at the downstreams side of dam 26, and being suitably gradually-sloped downwardly from the upstream side of the waterway to allow fingerlings to travel therethrough without injury.

The central finger-trapping unit 28 may be suitably braced to the dam 26, for example, by the provision of diagonal side struts 63, 63 bracing the opposite sides of enclosure 29 against dam 26.

As shown in FIGURE 2, the corner fingerling-trapping units 59 may be provided with auxiliary trapping screens defining a preliminary trap enclosure 64 in the corner region between dam 26 and shore 27 immediately ahead of the convergent intake guide screens 30, 30. Thus, the preliminary trapping-screen assembly may comprise two pairs of convergent vertical screens 65, 65 positioned substantially at right angles to each other and spaced at their inner ends to define vertical intake slots 66 leading into the space 64, the innermost screens meeting at their forward ends, as shown at 67, and the forward ends of the outermost screen elements 65, 65 converging substantially into engagement with respect to dam 26 and shore 27, respectively. Thus, fingerlings will be induced to move into the preliminary trap space 64 by the water current directed toward the corner between the dam 26 and shore 27, the fingerlings passing through the relatively narrow vertical slots 66 and thereafter, being induced to move through the slots 31 between the convergent intake screen elements 30, 30.

Similarly, means may be provided forwardly adjacent the upstream shore trapping stations 60 to provide preliminary trap enclosures 68 leading to the convergent intake screens 30, 30 of the shore-trapping stations, as shown in FIGURE 3. The preliminary trap enclosures are defined by respective convergent pairs of vertical screen elements 65 arranged at right angles to each other, as in FIGURE 2, but spanning an arc of substantially 180° around and concentric with the trapping station 60. As shown in FIGURE 3, four sets of convergent pairs of vertical screens 65 are provided, each pair of screens having spaced inner edges to define intake slots 66, with the outer edges of the screens meeting at 67 and with the end screens convergently-closing with the shore 27 at 69, 69 located substantially symmetrically on opposite sides of the trapping station 60, whereby to define the aforesaid preliminary trapping enclosure 68.

FIGURE 4 illustrates another variation which may be employed. In FIGURE 4 a pair of corner trapping stations 59, 59 are utilized, substantially as illustrated in FIGURE 1, except that the trapping units empty into ducts 70 extending through the dam 26 and leading to the downstream side of the dam, for example, to fish-ladder arrangements such as above-described. A generally V-shaped vertical screen assembly 71 is provided between the corner trapping stations 59, 59, whereby to define respective convergent passages leading to the corner trap stations 59, 59. The screen assembly 71 comprises a pair of buoyant rod or pole members 72, 72 connected at their forward ends at 73 and pivotally and slidably-connected at their rear ends to suitable vertical posts 74 anchored in the bed 75 of the waterway closely-adjacent to the upstream face of dam 26. Respective sets of overlapping depending screens 76 are secured to the pole or rod member 72 in the manner illustrated in FIGURE 5, the successive depending screen elements 76 overlapping at their margins to define substantially continuous screen-wall assemblies of substantial vertical height leading from the connection point 73 of the rods or poles 72 to the regions adjacent the corner traps 59. The screen assemblies will remain effective regardless of changes in level of the water, since the buoyant poles 72 moves with the water level.

Each fish-wheel unit 33, as shown in FIGURE 6, comprises a substantially rectangular buoyant hollow ring or shell 80 having the hollow longitudinal sidewalls 81 and 82 and the hollow transverse end walls 83 and 84, the hollow walls being suitably braced internally, as by the provision of cooperating diagonal strut bars 85, as shown in FIGURE 7.

The top surfaces of the shell walls 81, 82, 83 and 84 are flat so as to define catwalks enabling workers to be supported thereon for the purpose of performing suitable maintenance or repair operations, as required. The hollow shell 80 may be made of any suitable imperforate material, such as sheet metal, or the like.

Transversely-mounted in the hollow shell 80 adjacent the end wall 84 is a receiving trough 86 having a bottom wall 87 which is downwardly-convergent centrally and which leads to a discharge conduit 88. Suitable flexible conduits 89 may be connected to the outlet ends of the discharge conduits 88, the flexible conduits 89 leading to the various fingerling transfer-duct means above-described, such as the channel 34, the conduit 61, and the conduit passages 50, 51 and 70. The transversely-extending vertical front wall 90 of the receiving trough 86 is provided with the forwardly-extending horizontal flange 91.

Designated at 92 is a transversely-extending rotor shaft which is journaled in respective bearing blocks 93 and 94 mounted on the intermediate portions of the top surfaces of the longitudinal sidewalls 82 and 81. A drive pulley 95 is secured on the end of shaft 92 adjacent the bearing block 93, said pulley being drivingly-coupled to an electric driving motor 96 mounted on the top surface of wall 82, the shaft of the motor 96 being provided with a driving pulley 97 which is drivingly-coupled to the pulley 95 by a suitable belt 98. The pulley 95 is considerably larger than the driving pulley 97, so that a substantial speed reduction is provided between the shaft of motor 96 and the rotor shaft 92.

Generally designated at 99 is a rotor assembly which is mounted on the shaft 92 for rotation therewith. The rotor assembly 99 comprises a pair of circular end discs 100 secured to the inner portions of respective sets of radial rod elements 101, 102 and 103 secured on diametrically-opposite portions of the disc 100, the outer portions of the radial rod elements 101, 102 and 103 being braced to respective intermediate outer rod elements 104 and 105 by diagonal brace rods 106, as shown in FIGURE 7, whereby to define respective diametrically-opposite pairs of generally arcuate screen frames to which suitable screen 108 is fastened. The discs 100 and associated arcuate screen elements are rigidly-secured to the shaft 92 so as to rotate therewith. The arcuately-shaped screen frames include arcuate outer rod elements 109 concentric with the discs 100, and secured to the respective pairs of parallel arcuate outer frame rod elements are arcuately-shaped outer peripheral screens 110. The arcuate outer frame rods 109 are connected together and rigidly-braced by successive connecting rods 111, as shown in FIGURE 7, extending parallel to the shaft 92 and being located at the connections between the rods 109 and the radial rod elements 101 to 105.

It will thus be seen that the rotor assembly 99 comprises a pair of diametrically-opposed screened bucket assemblies having the peripheral screen walls 110 and the screen sidewalls 108. Each of said bucket assemblies also is provided with a radial screen wall 112 at the trailing end thereof, for example, assuming counterclockwise rotation, as viewed in FIGURE 9, the screened end wall 112 is located at the bottom end of the uppermost bucket element.

Each bucket element is provided at its trailing outer end portion with a transversely-extending box or trough 113 coextensive in width with the bucket element, and comprising an outer wall 114 which may be of sheet metal, or the like, an inner wall 115 of similar material secured parallel and spaced inwardly from the outer wall 114, and respective end walls 116, 116 also of imperforate material, such as sheet metal. Each trough member 113 is provided with a hinged bottom wall 117 which is hingedly-connected at 118 to the bottom edge of inner wall 115, the bottom wall 117 serving as a cover and being biased toward closed position by a coil spring 119 provided at each end of the bottom cover 117 and connecting the cover to the adjacent front wall 114, as shown in FIGURE 9. It will be seen that the bottom wall or cover 117 projects outwardly from the bottom edge of front wall 114, having the outwardly-projecting front lip or margin 120. The lip or margin 120 extends outwardly sufficiently to engage beneath the inwardly-projecting flange 91 of the fixed receiving trough 90, so that the bottom cover 117 is opened as the associated bucket sweeps upwardly past the flange 91 in the manner illustrated in FIGURE 8, allowing the contents of the trough 113 to empty into the receiving container 86. As upward movement of the bucket assembly continues, the lip 120 slips past the flange 91, allowing the springs 119 to reclose the cover. Thus, with the arrangement illustrated in FIGURES 6 to 10, as the rotor 99 revolves in a counterclockwise direction, as viewed in FIGURE 7, the left-hand bucket element becomes submerged in the hollow shell 80 and scoops up fingerlings, the fingerlings being moved into the box 113 as rotation continues, until finally, when the bucket rises out of the shell to the position shown at the right side of FIGURE 7, the flange 91 engages the lip 120, opening the bottom of the box and allowing the fingerlings trapped therein to pass outwardly over the flange 91 into the fixed receptacle 86 and thence through the discharge conduit 88 thereof and the flexible conduit 89 to the transfer duct or conduit which conveys the fingerlings toward the downstream side of the dam.

It will be noted that the scooping action of the rotor 99 also acts to induce water current flow toward the fish-trapping station, since the rotation of the bucket assembly physically moves water from the forward end of the shell 80 to the rear end thereof, and by properly adjusting the rate of rotation of the rotor assembly 90, a perceptible suction current may be generated. Thus, the boxes 113 act as paddle-buckets to induce the current. However, if so desired, external pump means may be provided at any suitable location along the waterway to further develop and reinforce the induced water current leading to the trap stations.

In the modified structural arrangement of FIGURE 11 and FIGURE 12, the bottom wall 117′ of each discharge box 113′ is biased upwardly toward closed position by coil springs 119′ connecting the side marginal portions of the hinged bottom wall 117′ to the radial frame bars 103 located thereabove. Secured to the inside bottom margin of the outer transverse wall 114 are the uniformly-spaced magnets 122 which exert magnetic attractive force on the hinged bottom wall 117′, which is made of magnetic material, such as sheet metal. Thus, the magnets 122 exert a further biasing action on the bottom cover 117′ urging it toward closed position. The outer marginal portion 120′ of bottom wall 117′ is provided at its ends with notches 123 and at its intermediate portion with a notch 124, and pivotally-mounted in the notches 123, 123 and 124 are respective catch levers 125 having hook portions 126 engageable with triangular lugs 127 on the outside surface of transverse outer wall 114, and being biased toward such engagement by coiled springs 128 acting outwardly against the depending bottom end portions 129 of the levers. The springs 128 are supported on bolt elements 130 secured to depending lugs 131 which are, in turn, secured in depending positions to the covers 117′. The bolts 130 pass loosely through the lever portions 129 and have retaining heads 132, as shown in FIGURE 12. Thus, the springs 128 act to bias the latch levers 125 in a counterclockwise direction, as viewed in FIGURE 12, namely, in a direction to keep the top hooks of the upstanding arms 126 in locking engagement with the triangular catch lugs 127.

The levers 125 are provided with outwardly-projecting legs 133 which are engageable with the flange 91 as the associated bucket element moves upwardly past the receiving container 86. Thus, as the box 133′ moves upwardly from the position of FIGURE 12, flange 91 causes the catch levers 125 to rotate clockwise, as viewed in FIGURE 12, causing the hook arms 126 to disengage from the lugs 127. Further upward movement of the box 113′ causes the flange 91 to act positively against the outwardly-projecting marginal portion 120′ of cover 117′ and to cause the cover to be pulled away from the magnets 122, allowing the contents of the box to discharge into the receiving trough 86 in the manner previously described, the springs 119′ being stretched and developing tension for returning the cover 117′ to its closed position after the outer edge thereof has slipped past the flange 91 with the continued upward movement of box 113′.

Springs 119′ are sufficiently strong to insure the closing of the box 113′ after the fish are emptied out of it. To prevent undesired slamming of the gate 117′ suitable conventional retarding means may be employed therewith.

As shown in FIGURE 13, the flange 91 may be provided at its underside with auxiliary magnets 134 located to exert magnetic attraction on the marginal cover portion 120′ as the box 113′ rises. As said box 113′ rises, flange 91 first contacts legs 133 and pushes said legs downwardly against the forces of the springs 128. By the time flange 91 has pushed the legs 133 downwardly and is about to engage cover portion 120', latches 126 are entirely disengaged from lugs 127 and cover 117' would be free to open except for the action of magnets 134, which reinforce the action of the springs 119' in maintaining contact and a good seal between flange 91 and cover portion 120' as box 113' rises further.

After the boxes have emptied into the fixed receptacle 86, the covers 117' re-close under the action of the springs 119' and the hook arms 126 lockingly re-engage with the triangular lugs 127, holding the boxes closed until they again engage the flange 91, in the manner above-described.

The rotor 99 is preferably provided with one or more radially-extending intermediate partition walls 135 which may be of any suitable shape, for example, which may be circular and which may have a diameter substantially greater than the diameter of the outer discs 100, the partition wall or walls 135 serving to prevent excessive lateral splashing of the water in the bucket assemblies which might otherwise occur under rough external water conditions. Thus, the baffle plates or discs 135 act to minimize lateral sloshing or splashing of the water in the bucket assemblies, namely, to minimize movements of the water in the axial direction of the rotor, and thus, tend to promote smooth outward movement of the fingerlings toward the collection boxes 113 or 113' as the bucket assemblies rotate downwardly through the water and thence upwardly toward engagement with the release flange on the fixed receiving container 86.

While certain specific embodiments of an improved system for transporting fingerlings downstream past a dam or similar obstruction have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A waterway having a dam constructed thereacross and means for conveying fingerlings downstream past the dam comprising a fish-trap means positioned in the waterway adjacent the upstream side of the dam, said fish-trap means including a fish-wheel assembly rotating on a horizontal axis and having at least one rotatable bucket member, means driving said fish-wheel assembly through repeated cycles of rotation, by-pass duct means adjacent the waterway leading from the upstream side of the dam to the downstream side thereof, a fixed open-topped receptacle on the fish-trap means, conduit means communicatively-connecting said receptacle to said duct means, said bucket member having a downwardly-swingable bottom cover, means biasing said cover toward closed position, said cover being located to pass upwardly adjacent said receptacle as the bucket member rotates, and cooperating means on the receptacle and the cover causing the cover to swing open as the bucket member moves upwardly past a top edge of the receptacle, whereby to allow fingerlings to pass from the bucket member into the receptacle, and wherein the fish-trap means comprises a buoyant shell with the bucket member rotating within the shell, said receiving container being mounted in one end portion of the shell.

2. The fingerling-conveying means of claim 1, and wherein the buoyant shell is in the form of a generally rectangular hollow ring with the receiving container extending transversely across one end portion of the ring.

3. The fingerling-conveying means of claim 1, and wherein the fish-trap means includes a vertical screen enclosure surrounding the fish-wheel assembly, said screen enclosure being provided with a pair of inwardly-convergent vertical screen wall elements separated at their inner ends to define a vertical intake slot, and means to induce a current directed toward said intake slot.

4. The fingerling-conveying means of claim 3, and wherein said vertical screen wall elements converge at an angle of approximately 90° with respect to each other.

5. The fingerling-conveying means of claim 1, and wherein said cooperating means comprises an outwardly-projecting portion of the cover and a projection on the receptacle top edge in the path of movement of said outwardly-projecting portion.

6. The fingerling-conveying means of claim 5, and wherein said projection comprises a horizontal flange on the top edge of the innermost wall of the receptacle projecting toward the fish-wheel assembly.

7. The fingerling-conveying means of claim 1, and downwardly-stepped fish-ladder means on the downstream side of the dam located beneath the outlet of said by-pass duct means.

8. The fingerling-conveying means of claim 7, and wherein said fish-ladder means comprises a plurality of receiving trough members located at successively descending levels on the downstream side of the dam.

9. The fingerling-conveying means of claim 8, and wherein said fish-ladder means is provided with inclined ramp means leading from each receiving trough member to the next lower receiving trough member.

10. The fingerling-conveying means of claim 8, and wherein said fish-ladder means comprises a pair of parallel wall members arranged substantially vertically on the dam, and successively-descending plate members mounted between said wall members and defining said receiving trough members.

11. The fingerling-conveying means of claim 1, and wherein the fish-trap means includes a vertical screen enclosure provided with a plurality of pairs of inwardly-convergent vertical screen wall elements separated at their inner ends to define a vertical intake slot at the inner ends of each pair of convergent vertical wall elements, and means to induce a current directed toward the intake slots.

12. The fingerling-conveying means of claim 11, and wherein the pairs of convergent screen wall elements subtend an angle of at least 90°.

13. The fingerling-conveying means of claim 11, and wherein the pairs of convergent screen wall elements are located at a corner between the dam and the shore of the waterway and subtend an angle of approximately 90°.

14. The fingerling-conveying means of claim 11, and wherein the pairs of convergent screen wall elements subtend an angle of approximately 180°.

15. The fingerling-conveying means of claim 14, and wherein the pairs of convergent screen wall elements are located adjacent a shore of the waterway at a location spaced upstream from the dam.

16. The fingerling-conveying means of claim 1, and wherein the means biasing the cover to closed position includes cooperating magnets and magnetic portions on the receptacle and the cover.

17. The fingerling-conveying means of claim 1, and wherein the fish-trap means comprises a first vertical screen enclosure having a pair of inwardly-convergent vertical screen wall elements separated at their inner ends to define a vertical intake slot, additional vertical screen means spaced outwardly from the first-named screen wall elements and including at least one additional pair of inwardly-convergent screen wall elements spaced at their inner ends to define another vertical intake slot, said additional screen wall elements defining an enclosure ahead of the fish-trap means, and means to induce a current directed toward said intake slots.

18. The fingerling-conveying means of claim 17, and wherein a plurality of pairs of said additional convergent screen wall elements are provided, subtending an angle of at least 90°.

19. The fingerling-conveying means of claim 18, and wherein the fish-trap means is located at a corner between a shore of the waterway and the dam, and the vertical screen assembly buoyantly-mounted adjacent the dam and having a portion converging with respect to said shore of the waterway to define a convergent channel leading toward the fish-trap means.

20. The fingerling-conveying means of claim 19, and wherein said vertical screen assembly comprises a pair of divergent buoyant poles connected at their inner ends, vertical supports adjacent the dam, means slidably-connecting the outer ends of the poles to said vertical supports, and a plurality of overlapping depending screen panels secured to said buoyant poles and extending substantially from the connected inner ends of the poles to the dam.

No references cited.

DAVID J. WILLIAMOWSKY, *Primary Examiner.*

P. M. CAUN, *Assistant Examiner.*